Sept 8, 1925.

C. L. KESSLER 1,552,932

GROUNDING DEVICE FOR ELECTRICAL CONDUITS

Filed Nov. 18, 1922

INVENTOR.
CHARLES L. KESSLER.
BY A. B. Bowman
ATTORNEY

Patented Sept. 8, 1925.

1,552,932

UNITED STATES PATENT OFFICE.

CHARLES L. KESSLER, OF SAN DIEGO, CALIFORNIA.

GROUNDING DEVICE FOR ELECTRICAL CONDUITS.

Application filed November 18, 1922. Serial No. 601,740.

*To all whom it may concern:*

Be it known that I, CHARLES L. KESSLER, a citizen of the United States, residing at San Diego, in the county of San Diego and State of California, have invented certain new and useful Improvements in Grounding Devices for Electrical Conduits, of which the following is a specification.

My invention relates to grounding devices for electrical conduits and the objects of my invention are: first, to provide a device of this class which can be quickly, easily and rigidly secured to electrical conduits or other pipes for grounding the conduits; second, to provide a device of this class which is applicable to all standard sizes of conduits and pipes, thus reducing to a minimum the stock of various sizes necessary to supply the demand; third, to provide a novel and absolute means for making an electrical contact with and grounding electrical conduits; fourth, to provide a novelly constructed device of this class, and fifth to provide a device of this class which is particularly simple and economical of construction, durable, efficient, practical and which will not readily deteriorate or get out of order.

Figure 1:
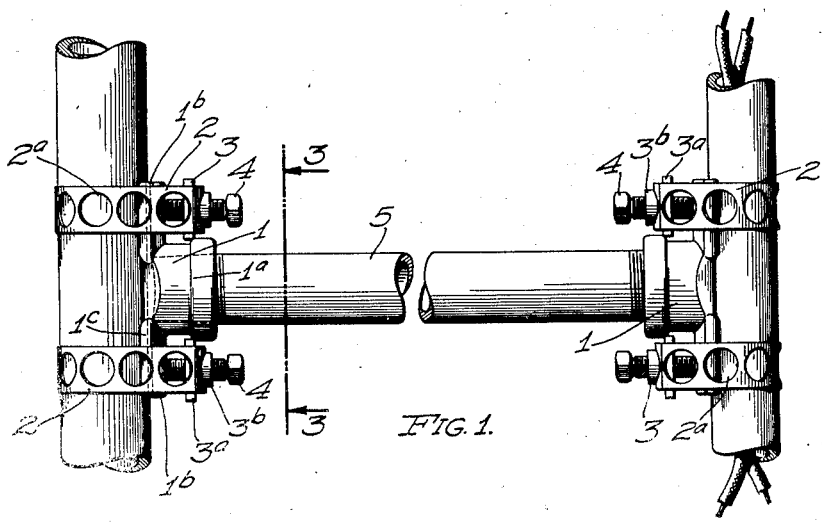
Figure 2:
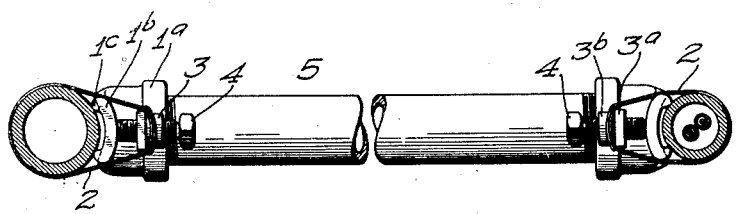
Figure 3:
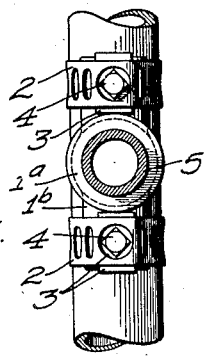

With these and other objects in view as will appear hereinafter, my invention consists of certain novel features of construction, combination and arrangement of parts and portions, as will be hereinafter described in detail, and particularly set forth in the appended claims, reference being had to the accompanying drawings and to the characters of reference thereon, which form a part of this application, in which:

Figure 1 is a side view of several of my devices, secured respectively to a water main and an electrical conduit and connected to each other, showing the water pipe, electrical conduit and connecting member, fragmentarily; Fig. 2 is a view taken at a right angle to that of Fig. 1, showing the devices secured to the water pipe and conduit, and Fig. 3 is a sectional view taken through 3—3 of Fig. 1.

Like characters of reference refer to similar parts and portions throughout the several views of the drawings.

The fitting members 1, straps 2, supporting members 3, clamp screws 4, and the connecting member 5, constitute the principal parts and portions of my grounding device.

The fitting member 1 is rigidly secured in position to the conduit or other pipe by the straps 2 which extend around the conduit or pipe and a portion of the fitting member 1. The fitting member 1 is preferably made of malleable iron in the form of a T and consists of an outwardly extended connecting lug portion 1ª provided with internal pipe threads, adapted to receive the one threaded end of the connecting member 5, and other portions 1ᵇ extending outwardly in opposite directions from the internally threaded lug portions, preferably in curved form to conform substantially with the pipe to which it is secured. The extended portions 1ᵇ of the member 1 are provided on the side adjacent the pipes with longitudinally extending lug portions 1ᶜ on either side thereof which are adapted to fit against the pipe to insure an absolute electrical contact therewith and particularly to form a good seat for pipes of various diameters which may be used. The straps 2 consist of the conventional flexible perforated metallic strap as used in electrical work. The supporting member 3 consists of a flat bar portion 3ª and a lug portion 3ᵇ extending outwardly therefrom and internally threaded to receive the clamp screw 4. The lug portions 3ᵇ of the supporting members 3 are of such a size as to be inserted into the perforations 2ª of the straps 2, which straps are usually made in long strips and cut off to a length as desired, one end of the strap being secured over the lug portion 3ᵇ, through one of the perforations, and extended around the pipe and secured over the lug portion at the other end substantially as shown in the drawings. With the ends of the straps 2 secured over said lug portions the clamp screws 4 are screwed down against the extended portions 1ᵇ of the fitting member, clamping the same tightly against the conduit or pipe. The fitting members 1 positioned against the pipe or conduit as described are connected with each other by the connecting member 5, which is preferably a pipe, thus forming a continuous electrical conductor between the conduit and other pipe which is permanently grounded.

Though I have shown and described a particular construction, combination and arrangement of parts and portions, I do not wish to be limited to this particular construction, combination and arrangement but desire to include in the scope of my invention, the construction, combination and arrangement substantially as set forth in the appended claims.

It is obvious that I have provided a grounding device which can be quickly, easily and rigidly secured to conduits, water or other pipes for grounding the conduits; that I have provided novel and absolute means for producing an absolute electrical contact for grounding purposes; that I have provided a device of this class which is applicable to conduits and other pipes of various sizes; that I have provided a novelly constructed device of this class, and that I have provided a device of this class which is particularly simple and economical of construction, durable, efficient, practical and which will not readily deteriorate or get out of order.

Having thus described my invention, what I claim as new and desire to secure by Letters Patent, is:

1. In a device of the class described, a fitting adapted to be positioned with its one side against a conductor provided with an outwardly extending hollow threaded pipe lug portion, a strap extending lengthwise around said conductor, the ends of said strap being positioned contiguous to said fitting, and takeup means positively connecting the free ends of said strap and engaging said fitting.

2. In a device of the class described, a fitting adapted to be positioned with its one side against a conductor provided with an outwardly extending hollow threaded pipe lug portion, a long strap extending lengthwise around said conductor and provided with spaced perforations throughout its length, the ends of said strap being positioned contiguous to said fitting, and take-up means connecting the free ends of said strap through the holes at the ends thereof and positively engaging said fitting.

3. In a device of the class described, a fitting adapted to be positioned with its one side against a conductor provided with an outwardly extending hollow threaded pipe lug portion, a long strap extending lengthwise around said conductor and provided with spaced perforations throughout its length, the ends of said strap being positioned contiguous to said fitting, a supporting member securing the free ends of said strap relatively to each other, and a clamp screw extending through said supporting member securing said fitting to said conductor.

4. A device of the class described, including a fitting provided with an outwardly extending internally threaded lug portion and other portions extending substantially at right angles therefrom, said extended portion being provided with spaced longitudinal lug portions on the side opposite said internally threaded lug portion, straps provided with spaced perforations, extending around the extended portions of said fitting and take-up means in connection with said perforated straps.

5. A device of the class described, including a fitting provided with an outwardly extending internally threaded lug portion and other portions extending substantially at right angles therefrom, said extending portion being provided with spaced longitudinal lug portions on the side opposite said internally threaded lug portion, straps provided with spaced perforations, extending around the extended portions of said fitting member, supporting members, positioned contiguous to the extended portions of said fitting and extending partially through the perforations near the ends of said strap securing the same together at its ends and screws extending through said supporting members and engaging the extended portions of said fitting.

6. In a device of the class described, the combination with pipes, of fittings provided with outwardly extending connecting lug portions and other portions extending therefrom, positioned in engagement with said pipes, straps extending around the extended portions of said fitting and adapted to extend around the adjacent pipe, take-up means in connection with said straps and said fitting and a connecting means connecting the fittings to each other by means of the connecting lug portions thereof.

In testimony whereof, I have hereunto set my hand at San Diego, California, this 13th day of November, 1922.

CHARLES L. KESSLER.